(12) United States Patent
Maldaner et al.

(10) Patent No.: US 10,946,451 B2
(45) Date of Patent: Mar. 16, 2021

(54) METHOD AND DEVICE FOR THE MACHINING OF THE WHEEL RUNNING SURFACE OF WHEELS FOR RAIL VEHICLES

(71) Applicant: Hegenscheidt-MFD GmbH, Erkelenz (DE)

(72) Inventors: Jandrey Maldaner, Aachen (DE); Alexander Rudi, Geilenkirchen (DE)

(73) Assignee: Hegenscheidt-MFD GmbH, Erkelenz (DE)

( * ) Notice: Subject to any disclaimer, the term of this patent is extended or adjusted under 35 U.S.C. 154(b) by 0 days.

(21) Appl. No.: 16/131,916

(22) Filed: Sep. 14, 2018

(65) Prior Publication Data
US 2020/0086392 A1    Mar. 19, 2020

(51) Int. Cl.
| | | |
|---|---|---|
| *B32B 5/32* | (2006.01) | |
| *B23B 5/32* | (2006.01) | |
| *B21B 28/02* | (2006.01) | |
| *B21B 37/46* | (2006.01) | |

(52) U.S. Cl.
CPC ............... *B23B 5/32* (2013.01); *B21B 28/02* (2013.01); *B21B 37/46* (2013.01)

(58) Field of Classification Search
CPC .. B23B 5/28; B23B 5/32; B21B 28/02; B21B 28/04; B21B 31/16; B21B 37/46; B21B 2275/04; B21B 2275/10; B21B 2275/12; B21H 1/04; B23P 9/02; B21D 22/16

See application file for complete search history.

(56) References Cited

U.S. PATENT DOCUMENTS

| | | | | |
|---|---|---|---|---|
| 3,367,160 A | * | 2/1968 | Sperber | B24B 39/04 |
| | | | | 72/86 |
| 3,868,839 A | * | 3/1975 | Sentourens | B21D 1/06 |
| | | | | 72/14.4 |
| 4,399,724 A | * | 8/1983 | Dombrowski | B23B 5/32 |
| | | | | 82/104 |
| 4,559,482 A | * | 12/1985 | Fencl | B21D 53/30 |
| | | | | 318/50 |
| 4,760,724 A | * | 8/1988 | Okazaki | B21B 37/78 |
| | | | | 72/13.4 |
| 4,951,534 A | * | 8/1990 | Brinkmann | B23B 5/32 |
| | | | | 82/105 |
| 5,105,691 A | * | 4/1992 | Brinkmann | B23B 5/32 |
| | | | | 82/105 |
| 6,223,576 B1 | * | 5/2001 | Mashita | B21H 1/04 |
| | | | | 72/102 |
| 6,347,550 B1 | * | 2/2002 | Kroening | B61K 9/12 |
| | | | | 73/598 |
| 7,261,620 B2 | * | 8/2007 | Boms | B23B 5/32 |
| | | | | 409/165 |

(Continued)

FOREIGN PATENT DOCUMENTS

JP    58-35025 A  *  3/1983  ............. B21D 22/16

*Primary Examiner* — Edward T Tolan
(74) *Attorney, Agent, or Firm* — Harness, Dickey & Pierce, P.L.C.

(57) ABSTRACT

A method for machining the wheel running surfaces of wheels for rail vehicles using a wheel machining machine is described herein. The method includes performing a rolling process on the wheels with a rolling tool that applies a rolling force to the wheels, and adjusting the rolling force by controlling the torques of drive motors of feed axles of the rolling tool.

11 Claims, 5 Drawing Sheets

(56) References Cited

U.S. PATENT DOCUMENTS

| | | | | |
|---|---|---|---|---|
| 7,827,684 | B2* | 11/2010 | Heimann | B24B 5/42 |
| | | | | 29/888.08 |
| 8,789,448 | B2* | 7/2014 | Ross | B23B 5/32 |
| | | | | 82/104 |
| 2008/0216621 | A1* | 9/2008 | Nijssen | B23B 5/32 |
| | | | | 82/105 |
| 2009/0116921 | A1* | 5/2009 | Naumann | B21H 7/185 |
| | | | | 409/131 |
| 2011/0041580 | A1* | 2/2011 | Ogawa | B21B 37/46 |
| | | | | 72/31.07 |
| 2015/0367459 | A1* | 12/2015 | Feldmann | B24B 39/045 |
| | | | | 72/252.5 |

* cited by examiner

METHOD AND DEVICE FOR THE MACHINING OF THE WHEEL RUNNING SURFACE OF WHEELS FOR RAIL VEHICLES

FIELD

The present disclosure relates to a method and device for the machining of the wheel running surface of wheels for rail vehicles.

BACKGROUND AND SUMMARY

The background description provided here is for the purpose of generally presenting the context of the disclosure. Work of the presently named inventors, to the extent it is described in this background and summary section, as well as aspects of the description that may not otherwise qualify as prior art at the time of filing, are neither expressly nor impliedly admitted as prior art against the present disclosure.

Wheelsets of rail vehicles are designed to provide and ensure safe support and guidance of the rail vehicle by permanent contact between wheel and rail. By means of this rolling contact the wheelsets are stressed directly and are safety-relevant for controlled vehicle movement. Through its interaction with the rail, the geometry of the wheel running surface determines the running of the vehicles. The wheelset is therefore of particular importance in the maintenance of rail vehicles. The high demands on reliability and quality require regular inspection and assessment of the current component state and the available abrasive wear material.

During vehicle movement operation, the wheel-rail system is subjected to different wear mechanisms due to the constant sliding and rolling movements. In addition to the acoustic disturbance for passengers and the surrounding area, the resulting deformation in the wheel running surface profile also poses the danger of material failure for the wheelset and surrounding components, such as the wheel bearing and undercarriage. This problem is to be counteracted and largely avoided by the so-called reprofiling of the wheel running surface profile.

The aim in designing the wheel running surface profile is a safe, low-wear guide ensuring a comfortable ride. For this reason, contours are realized which take into account the natural wear between wheel and rail. In an ideal case, the contours are either not to change at all, or only slightly, during operation of the rail vehicles.

The resulting wear by the removal of material on wheel and rail depends primarily on the friction in the contact zone and the combination of materials. Here, a basic distinction is made between running surface and wheel flange wear. By combining these two wear profiles, a possible wear profile results which is to be reprofiled.

Such a reprofiling can be carried out with wheelset reprofiling machines, which are known in various type variants, for example as underfloor or surface versions as well as in flatbed and portal designs. By means of wheelset reprofiling machines, machining processes are used for machining the wheel running surfaces, preferably by turning, so that these machines are also designated as wheelset lathes.

Starting from the understanding that, as a result of introducing residual compressive stresses into the surfaces of rotation-symmetric objects, wear behaviour can be improved, it has already been proposed to subject selected wheelset sections to an additional deep rolling process directly after wheel manufacture in new condition or at a later date following successful reprofiling. In this way an increase in the further service life of the wheel running surfaces can be achieved by deep rolling.

The deep rolling of the surface is a minimally invasive mechanical re-shaping of the edge layer of the component. During this process, suitable rolling elements are guided over the finished component surface under contact pressure. The direct component contact area is plastically deformed while the adjacent contact area is elastically deformed. Depending on the respective actual contact conditions, only the surface is being finished, with minor notches being levelled or the material in the plastically deformed volume is strengthened.

Thus, when deep rolling is used for wheelsets, the work hardening of the wheel running surfaces achieves a finishing or reduction of the surface roughness, a hardening of the boundary layer and an introduction of residual compressive stresses into the boundary area. Any damaging residual stresses present in the edge layer of the workpiece as a result of the pre-machining cutting are eliminated through the re-shaping. By means of the interaction of elastic and plastic deformations a residual stress state advantageous in terms of strength is newly imprinted. Following deep rolling, residual compressive stresses are present in the external boundary layer; these cause a reduction in the wear of the wheel running surfaces or an increase in the mileage of the rail vehicle wheels. This causes the occurrence of any cracks as well as their progression to be significantly restricted. This exclusively mechanical surface treatment by deep rolling is a very effective, environmentally friendly and resource-saving process.

DE 808 197 describes a roller for the deep rolling of axle journals in railway wheelsets. The working surface of this work roller consists of a cylindrical base body. During deep rolling the axis of the work roller runs at an incline to the axis of the axle journal and generates a strung out drop-shaped impression on the surface to be machined. Accordingly, in the area of the impression, deep rolling introduces residual stresses into the surface of the axle journals, by means of which the occurrence of new cracks is to be avoided and/or the further progression of any existing cracks is to be stopped. Deep rolling therefore results in an increase of the service life of a wheelset. The contact force of the work roller is generated by pre-clamping means.

An additional approach for the deep rolling of cylindrical shafts is known from DE 843 822. This device features one or several work rollers. Here, each work roller is supported in a swivelling carrier the swivel axis of which runs vertically to the feed motion of the work roller and approximately vertically to the wheelset shaft. Here, too, the contact force of the rollers is produced by corresponding pre-clamping means, springs and the like.

Using the device for the deep rolling of wear surfaces on the profile of rough-turned wheelsets according to DE 1 278 274, different relative positions can be set between the work roller, its feed device and the wheelset turning axis. Here, for guide rolling, an additional device with hydraulic pre-clamping of a counter-bearing roller is additionally described.

The advantages of deep rolling, in particular subsequent to any reprofiling by machining, in particular turning, are known and described comprehensively.

It has been shown that the deep-rolling does not necessarily produce a uniform boundary layer, so that either a reprofiled geometry with the surface of differently distributed strength properties is formed or the reprofiled geometry is slightly changed by the deep rolling.

Thus, according to the state of the art according to the previously known methods with the proposed devices, good results are achieved in rolling consolidation, but the described shortcomings are not taken into account and eliminated.

Based on the above-described state of the art, the present invention is based on the task to optimize the method and device for machining wheel running surfaces of rail vehicles to the effect that, even after deep rolling, an improved surface homogeneity with an optimized profile can be achieved.

Pursuant to the method in accordance with the invention it is intended that roller machining is carried out following a reprofiling by the usual procedure. The rolling process is carried out under a defined and controllable force, so that the final result is significantly improved.

On the one hand, the procedure in accordance with the invention has the advantage that in the final stage a largely homogenized surface finish is achieved with an optimized geometric design of the wheel. Both depending on the respective rolling position and the position of the respective work roller, possibly also its geometry, a defined rolling force can now be applied to each point to be machined, and thus an optimum final result can be achieved.

In this way, a reprofiling can be carried out by several successive measuring and machining steps. Machining is to be preferably effected by turning. But of course it is also possible to use other methods that may provide for a time-optimized utilization. This includes grinding, milling and the like. Due to the technical design of the method in accordance with the invention and the subsequent reworking on the rollers there results a greater flexibility here. This leads to better work results in shorter machining times.

Advantageously, a clamping point is used to be able to use the machining tool on the one hand for machining, and on the other hand for rolling. This clamping position can have a defined position relative to the aligned wheel and to the wheel to be machined, and thus an optimized control can be used, which provides the wheel with an optimum geometry within the shortest possible time period. Depending on the device a large number of clamping devices can be used that can be equipped flexibly. Depending on the machining process, a corresponding control system can be used.

With the invention, an innovative method for machining the wheel running surfaces of wheelsets for rail vehicles is provided which can be used on any machine, underfloor, overhead, mobile, numeric controlled (NC), and the like. On the one hand it optimizes the machining time and on the other hand the final wheel geometry. In addition, the surface quality of the rolled wheel is significantly improved, which may result in a prolonged service life.

On the device side, a device for implementing this method is characterized in that there is at least one clamping unit for a tool which has a defined position relative to a wheel positioned by basic setting. This clamping unit serves alternately to receive a turning tool or a rolling tool.

This invention provides on the one hand for successive machining and on the other hand for deep rolling processes to be carried out in any sequence and to supplement the same with corresponding measurements. In this way, very precise machining and control can be effected in a time- and geometry-optimized manner. In addition, tools for machining on the one hand and different rolling units on the other hand can be used very flexibly, depending on whether partial profiles or overall profiles are processed.

In accordance with the invention a solution is provided which can be implemented at low economic cost, by means of which optimized wheel geometries can be produced. In particular, the invention may yield considerable time savings.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
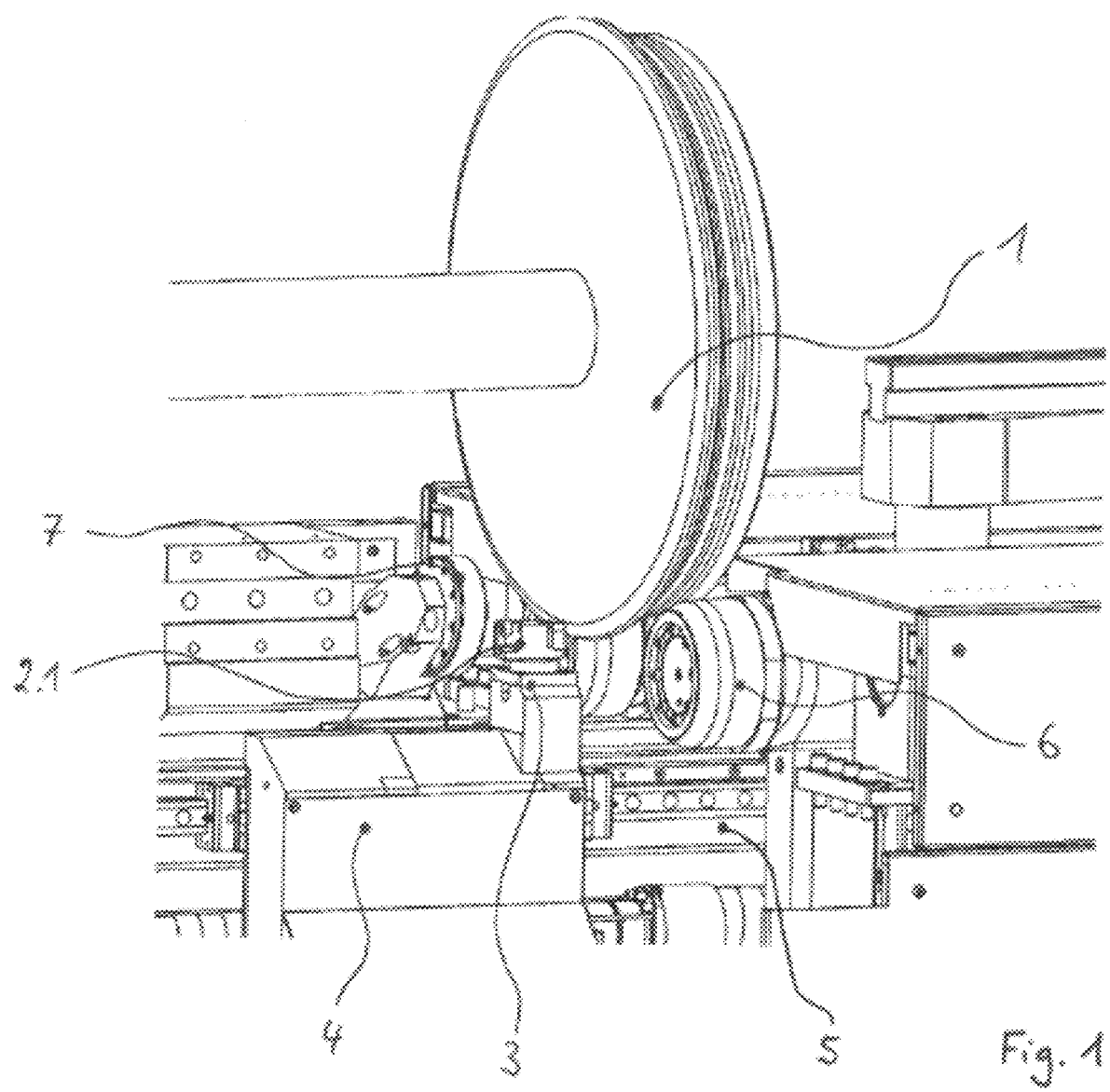
FIG. 1 is a perspective view of a device in accordance with the invention for carrying out the method in accordance with the invention in a reprofiling constellation.

By way of example, the figures show a wheel machining machine 5. In the wheel machining machine 5, a wheelset 1 is brought to a specific position via corresponding transport paths, as shown in the figures. Wheelset 1 is rotated by drive roller 6. In the example of FIG. 1, a tool holder/clamping unit 3 is equipped with a turning tool 2.1 and is mounted in a positionally definable position on tool support or post 4. The wheelset 1 put into rotation can now be machined (e.g., turned) by means of turning tool 2.1. Reference number 7 designates the axial guide roller which can take up the axially occurring forces and axially fix wheelset 1 in position.

Figure 2:
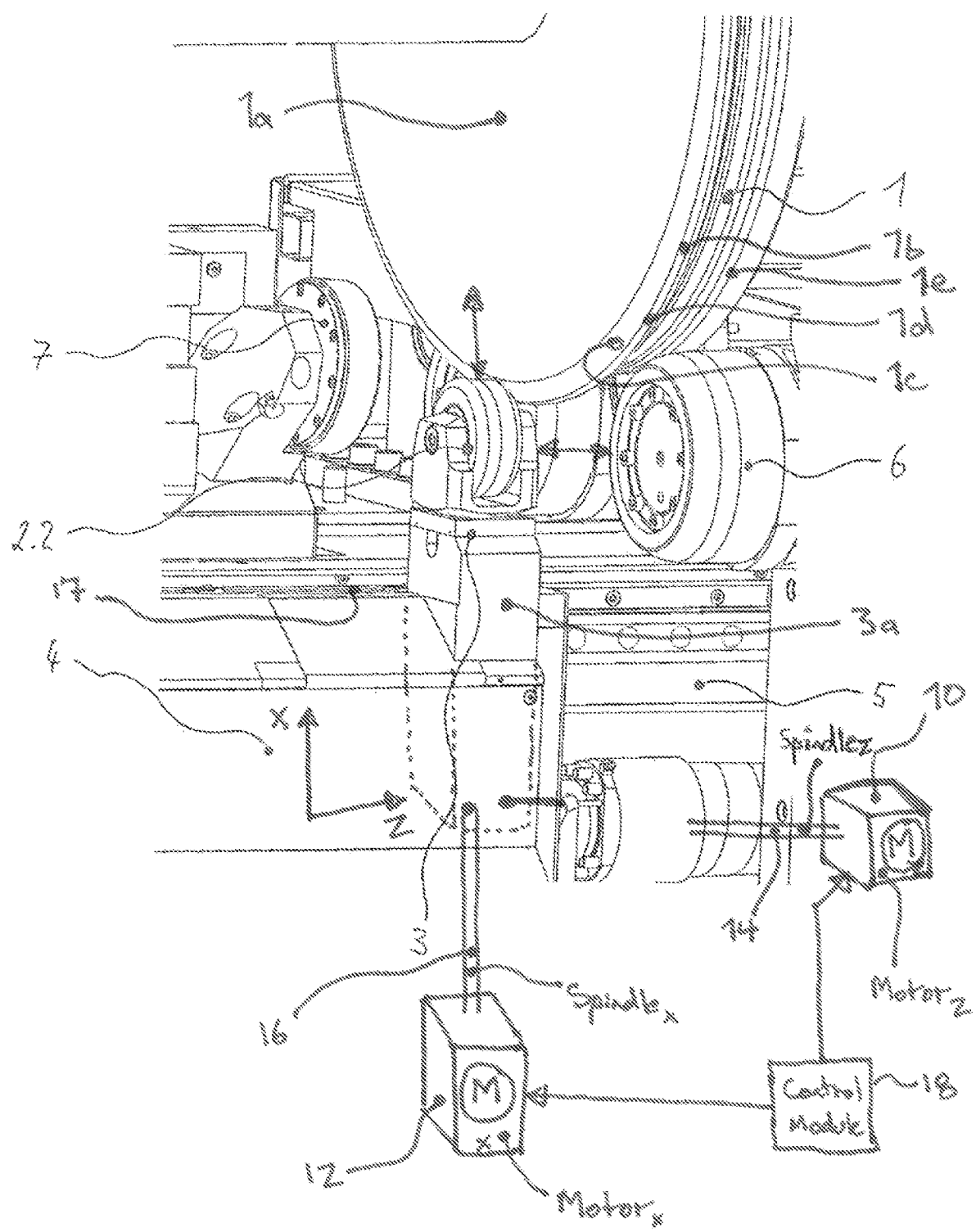
FIG. 2 is a view according to FIG. 1 in a rolling constellation.

In accordance with FIG. 2 a rolling tool 2.2 is inserted into the tool holder 3, so that, for example, it is now possible to perform deep rolling subsequent to a reprofiling.

In the special embodiment (FIG. 3), machine 5 can also be provided with a measurement device or tool 8 equipped with probes. In this way, a subsequent measurement can be performed directly, for example after reprofiling and/or also after deep rolling. The measurement tool 8 is integrated in the tool post 4 and can be extended next to holder 3.

Referring again to FIG. 2, machine 5 further includes a first motor 10, a second motor 12, a first spindle or feed axle 14, and a second motor spindle or feed axle 16. First spindle 14 couples first motor 10 to holder 3 such that rotation of first motor 10 causes linear translation of holder 3 along an x-axis. First spindle 14 may be coupled to first motor 10 via one or more gears. The x-axis is perpendicular to the work piece (e.g., perpendicular to axial end surface 1a of wheelset 1). Second spindle 16 couples second motor 12 to holder 3 such that rotation of second motor 12 causes linear translation of holder 3 along a z-axis. Second spindle 16 may be coupled to second motor 12 via one or more gears. The z-axis extends along the work piece (e.g., parallel to axial end surface 1a of wheelset 1 and perpendicular to side surface 3a of holder 3) and is perpendicular to and within the same plane as the x-axis. Holder 3 is mounted on a sliding track or way 17 that allows holder 3 to move along the x- and z-axes.

A control system or module 18 may control first and second motors 10 and 12 to adjust the position of holder 3 along the x- and z-axes, respectively. Control module 18 may adjust the position of holder 3 along the x- and z-axes with respect to wheelset 1 to achieve a predetermined shape or contour of wheelset 1. For example, control module 18 may adjust the position of holder 3 along the x- and z-axes based on the angular position of wheelset 1, the position of rolling tool 2.2 relative to wheelset 1, and/or the geometry of rolling tool 2.2 to achieve the predetermined wheel contour.

When deep rolling is performed, rolling tool 2.2 applies a rolling force to wheelset 1. Movement of holder 3 along the x- and z-axes affects the magnitude of the rolling force. Control module 18 may adjust the rolling force by controlling the torque output of first motor 10 to adjust the movement of holder 3 along the x-axis. Additionally or alternatively, control module 18 may adjust the rolling force by controlling the torque output of second motor 12 to adjust the movement of holder 3 along the z-axis.

Control module 18 may control the torque output of first and second motors 10 and 12 to achieve a predetermined rolling force using, for example, a predetermined relationship between the torque output of first and second motors 10 and 12 and the rolling force. In one example, control module 18 adjusts the torque output of first motor 10 to a first predetermined torque and adjusts the torque output of second motor 12 to a second predetermined torque. When the torque output of first and second motors 10 and 12 is equal to the first and second predetermined torques, the rolling force applied by rolling tool 2.2 to wheelset 1 is equal to the predetermined rolling force.

Control module 18 may determine the torque output of first and second motors 10 and 12 based on inputs from sensors (not shown) that measure the torque output. Alternatively, control module 18 may determine the torque output of the first and second motors 10 and 12 based on a predetermined relationship between the amount of power supplied to first and second motors 10 and 12 and the torque output thereof. Alternatively, control module 18 may use the predetermined relationship to control the amount of power supplied to first and second motors 10 and 12 to achieve the first and second predetermined torques, respectively, without determining the torque output of the first and second motors 10 and 12.

Control module 18 may control the torque output of the first and second motors 10 and 12 to achieve a constant predetermined rolling force for the entire circumference of wheelset 1. Alternatively, control module 18 may control the torque output of first and second motors 10 and 12 to achieve a predetermined rolling force that varies depending on the angular position of wheelset 1, the position of rolling tool 2.2 relative to wheelset 1, and/or the geometry of rolling tool 2.2. For example, control module 18 may select a target rolling force from a plurality of predetermined rolling forces based on the angular position of wheelset 1, and control the torque output of first and second motors 10 and 12 to achieve the target rolling force.

In addition to or instead of controlling the torque output of first and second motors 10 and 12 to adjust the rolling force, control module 18 may control the position of holder 3 along the x- and z-axes with respect to wheelset 1 to adjust the rolling force. Control module 18 may control the position of holder 3 along the x- and z-axes to achieve the predetermined rolling force using, for example, a predetermined relationship between the position of holder 3 along the x- and z-axes and the rolling force. Control module 18 may track the position of holder 3 based on commands sent to first and second motors 10 and 12. Additionally or alternatively, machine 5 may include one or more sensors (not shown) that measure the position of holder 3 and/or the positions of first and second motors 10 and 12, and control module 18 may determine the position of holder 3 based on input(s) from the sensor(s).

Regardless of whether control module 18 adjusts the rolling force by controlling the torque output of first and second motors 10 and 12 or controlling the position of holder 3, control module 18 may adjust the rolling force to achieve a predetermined rolling force. The predetermined rolling force may vary depending on the location at which rolling tool 2.2 contacts wheelset 1. For example, control module 18 may control the rolling force according to a full profile that specifies a unique predetermined rolling force for various points along axial end surface 1a and/or outer radial edge 1b of wheelset 1. Alternatively, control module 18 may control the rolling force according to a plurality of partial profiles that each specify a predetermined rolling force for a portion of axial end surface 1a and/or a portion of outer radial edge 1b of wheelset 1. In various implementations, only the area from a backside 1c of flange 1d on wheelset 1 to chamfer 1e on wheelset 1 can be rolled.

Figure 3:
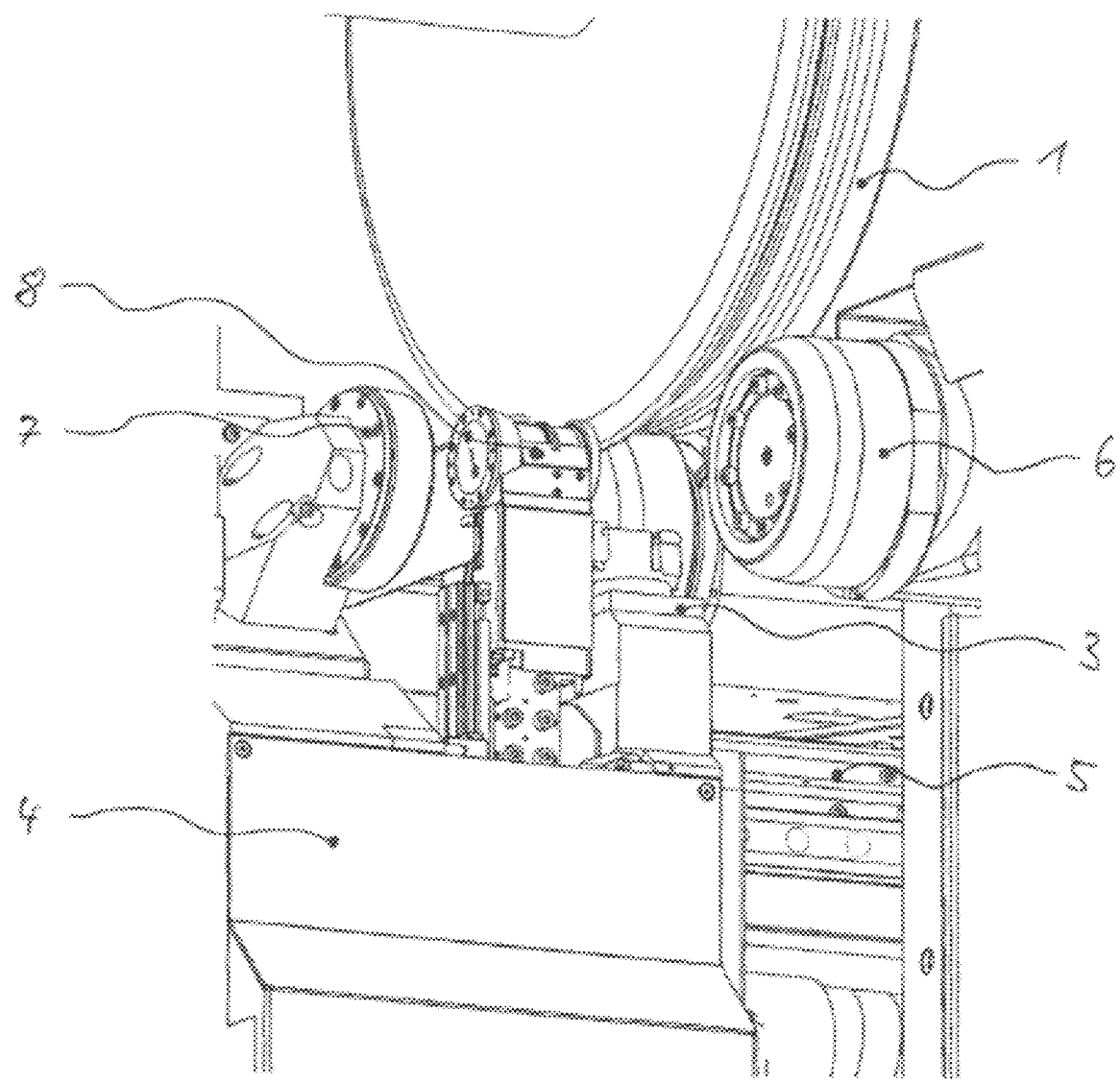
FIG. 3 is a view according to FIG. 1 in a measuring constellation.

With additional reference to FIGS. 1 and 3, control module 18 may also control the position of holder 3 along the x- and z-axes when machining wheelset 1 to achieve the predetermined wheel contour. In one example, during the first machining operation, control module 18 controls the position of holder 3 along the x- and z-axes according to a predetermined machining profile that specifies holder position with respect to angular position of wheelset 1. Next, measurement tool 8 is used to assess the difference between the predetermined wheel contour and the actual contour of wheelset 1. Then, during the next machining operation, control module 18 controls the position of holder 3 along the x- and z-axes to minimize the difference between the predetermined wheel contour and the actual contour of wheelset 1.

The machining and measuring process described above may be repeated multiple times to reprofile the geometry of wheelset 1 until the actual contour of wheelset 1 is within a predetermined range of the predetermined wheel contour. Then, turning tool 2.1 may be removed from holder 3, rolling tool 2.2 may be installed on holder 3, and the deep rolling process described above may be performed to work harden the running surfaces of wheelset 1. After machining and measuring wheelset 1 and before deep rolling wheelset 1, a basic setting of wheelset 1 and machine 5 relative to one another may be performed. As noted above, deep rolling may slightly change the reprofiled geometry of wheelset 1. Thus, after performing deep rolling, rolling tool 2.2 may be removed from holder 3, turning tool 2.1 may be installed on holder 3, and the above measurement and machining process may be performed once again. As a result, wheelset 1 has consistent strength properties across the reprofiled surface thereof, and the reprofiled surface matches the predetermined wheel contour.

Figure 4:
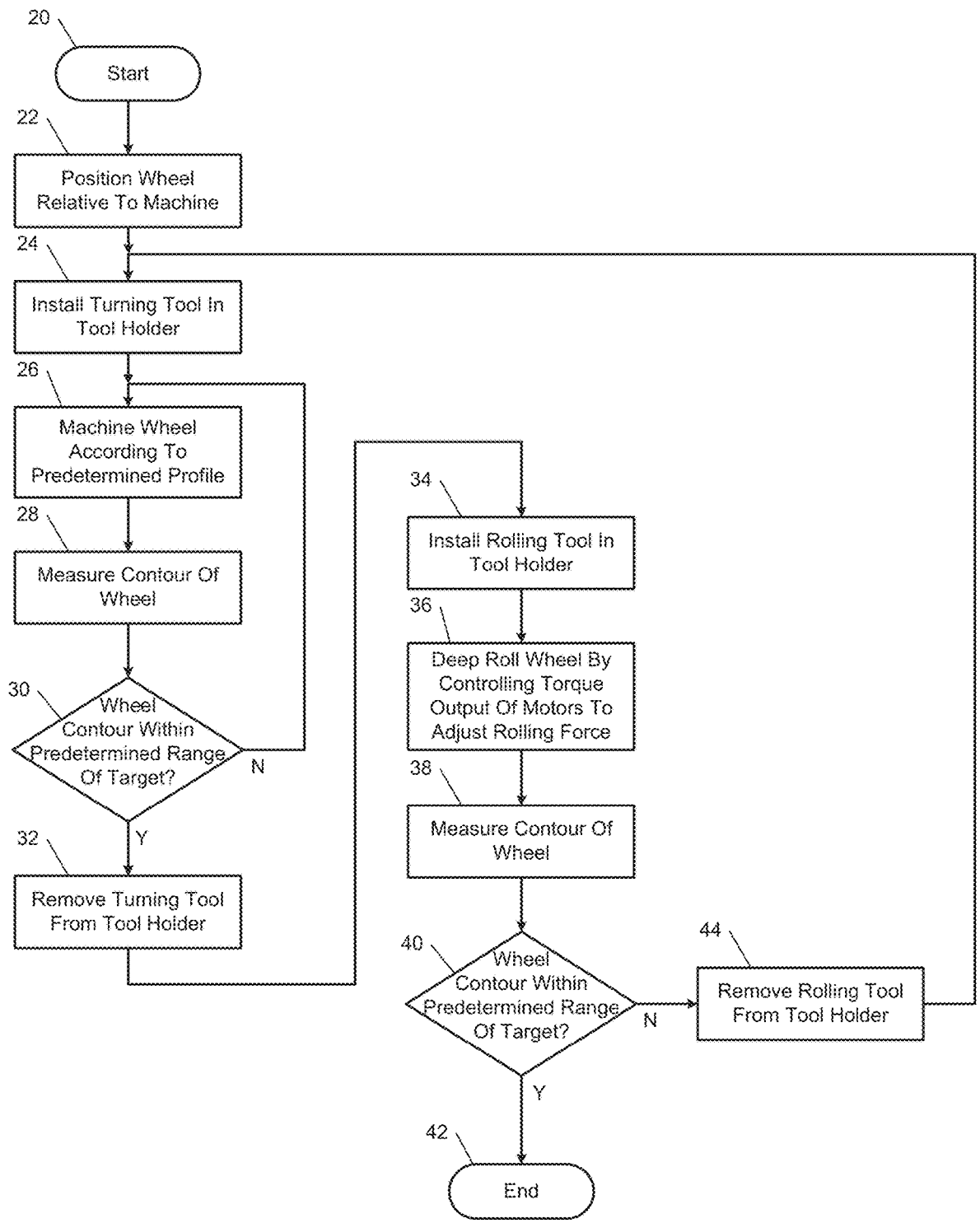
FIG. 4 is a flowchart illustrating an example method for machining and/or rolling the running surface of wheels for a rail vehicle according to the present disclosure.

Referring now to FIG. 4, an example method for machining the running surface of a wheel for a rail vehicle according to the present disclosure begins at 20. For ease of discussion, the method of FIG. 4 is described with reference to machine 5 of FIGS. 1-3. However, the method of FIG. 4 may be performed using a different machine.

At 22, a wheel is positioned relative to machine 5. At 24, turning tool 2.1 is installed in holder 3. At 26, the wheel is machined according to the predetermined machining profile. For example, control module 18 may control the position of holder 3 along the x- and z-axes according to a predetermined machining profile as discussed above while the wheel is rotated with respect to machine 5.

At 28, measurement tool 8 is used to measure the contour of the wheel. At 30, it is determined whether the actual (or measured) contour of the wheel is within a predetermined range of the predetermined (or target) wheel contour. If the actual wheel contour is within the predetermined range of the target wheel contour, the method continues at 32 and removes turning tool 2.1 from holder 3. Otherwise, the method returns to 26.

At 34, rolling tool 2.2 is installed in holder 3. At 36, deep rolling is performed on the wheel by controlling the torque output of first and second motors 10 and 12 to adjust the rolling force applied by rolling tool 2.2 to the wheel while the wheel is rotated with respect to machine 5. For example, control module 18 may adjust the torque output of first and second motors 10 and 12 to the first and second predetermined torques, respectively, in order to achieve the predetermined rolling force. When performing deep rolling, control module 18 may monitor the torque output of the first and second motors 10 and 12 using, for example, torque sensors, and thereby avoid an unintended or unacceptably large deformation of the wheel surface with concomitant increase in force.

At 38, measurement tool 8 is used to measure the contour of the wheel. At 40, it is determined whether the actual (or measured) contour of the wheel is within a predetermined range of the predetermined (or target) wheel contour. If the actual wheel contour is within the predetermined range of the target wheel contour, the method ends at 42. Otherwise, the method continues at 44, removes rolling tool 2.2 from holder 3, and returns to 24.

When two elements come into contact, such as rolling tool 2.2 and wheelset 1 coming into contact, tension occurs in the area of contact. Depending on the elasticity of the bodies, plastic deformation and a flow of material occurs. In general, this is called cold forming/cold hardening, which hardens the surface area of the body element. Compressive stress is produced and the surface is smoothed. These measures can extend the lifetime of a cyclic strained element (e.g., wheelset 1). The tension in the structure depends on the geometry and the applied power (Hertz's theory).

The power applied by rolling tool 2.2, or the rolling force per unit of time, depends on a spring packet in way 17 with a given power-way-curve. Rolling tool 2.2 follows a surface line depending on way 17 and controlled by way 17. This spring packet is compressed to a certain working point which represents a given press power. In case there is a deviation of the surface contour of wheelset 1, a change of spring force applied by way 17 occurs. So the power and the tension are changed. This influences the level of hardening, the surface quality and the pressure residual stress.

The power applied by a rolling tool may be introduced by hydraulic pressure, which is produced by an additional hydraulic aggregate. Constant pressure produces a constant power, which smooths the changes of stress and surface quality. However, technically and economically, it is a higher investment and requires additional aggregates, pipes, energy and the like, as well as hydrodynamic supported tools and the like.

The power applied by rolling tool 2.2 is introduced by electromechanical power, which is produced first and second motors 10 and 12 (e.g., electromechanical motors) that are used to move holder 3 along the x- and z-axes. Due to controlling first and second motors 10 and 12 based on torque, the deep rolling process described herein is not sensitive to deviation of the contour of wheelset, as the introduced power and finally the surface quality may be the same everywhere on the rolled surface.

Figure 5:
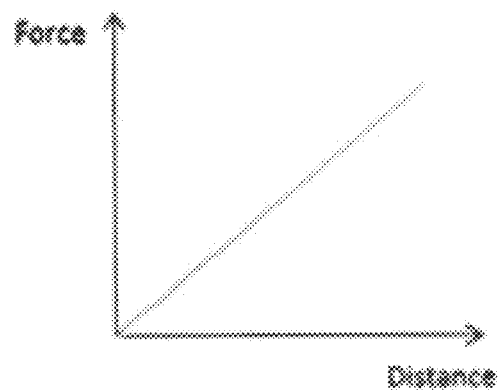
FIGS. 5 and 6 are graphs showing examples of a rolling force applied by a rolling tool to a wheel surface as a function of a distance travelled by a holder for the rolling tool.
Figure 6:
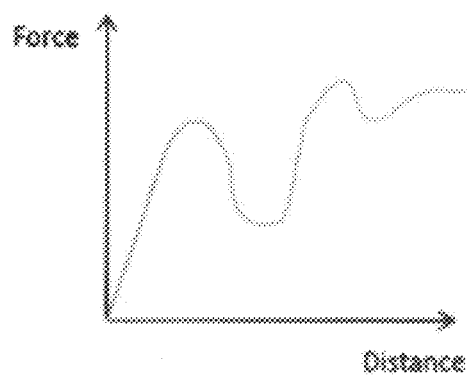

At the beginning of the deep rolling process, the torque output of first and second motors 10 and 12 may be increased until a predetermined rolling force or power is reached. When wheelset 1 is static (i.e., not moving), the rolling force increases in a linear manner with respect to the distance travelled by holder 3 as shown in FIG. 5 until the predetermined rolling force is reached. However, the deep rolling process according to the present disclosure is dynamic (i.e., is performed while wheelset 1 is rotating). Thus, the rolling force increases in a nonlinear manner with respect to the distance travelled by holder 3 as shown in FIG. 6.

The pressure applied by rolling tool 2.2 to the work piece (i.e., wheelset 1) may be kept constant, which results in a smoothed hardening, smoothed surface quality, and smoothed residual stress. Since the contact area between rolling tool 2.2 and the work piece changes depending on the surface profile of the work piece, the rolling power applied by rolling tool 2.2 may be adjusted to adapt for the changing surface profile of the work piece. For example, control module 18 may determine the magnitude of a target rolling power to be applied by rolling tool 2.2 based on the surface profile of wheelset 1, and adjust the torque output of first and second motors 10 and 12 to achieve the target rolling power. Control module 18 may determine the surface profile of wheelset 1 based on an input from a sensor (not shown) that measures the surface profile of wheelset 1. Alternatively, the surface profile of wheelset 1 may be predetermined and stored in control module 18.

Figure 7:
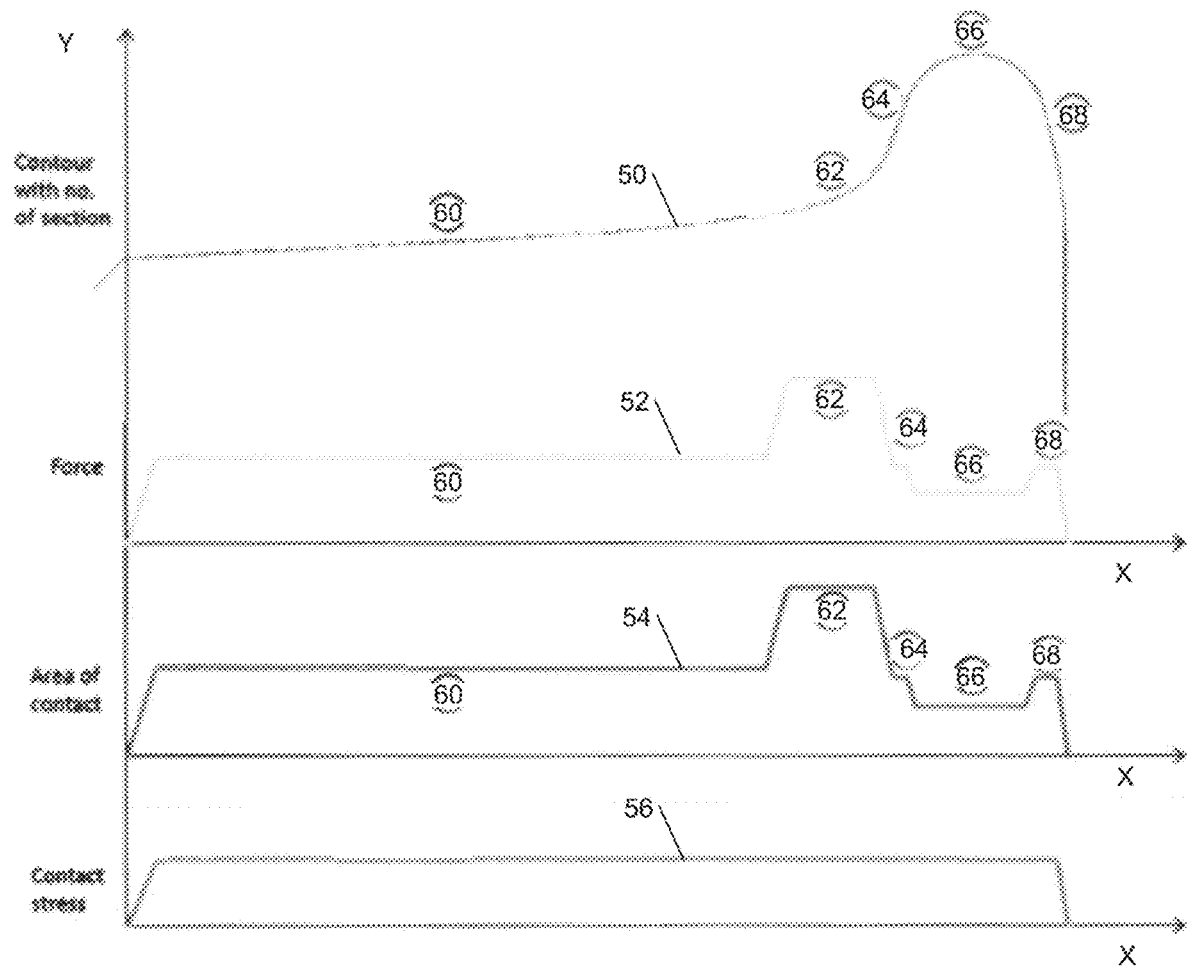
FIG. 7 is a graph showing examples of a contour of a wheel surface, a rolling force applied by a rolling tool to the wheel surface, an area of contact between the rolling tool and the wheel surface, and a contact stress between the rolling tool and the wheel surface.

FIG. 7 illustrates examples of a contour 50 of the surface of wheelset 1, a rolling force 52 applied by rolling tool 2.2 to wheelset 1, an area of contact 54 between rolling tool 2.2 and wheelset 1, and a contact stress 56 between rolling tool 2.2 and wheelset 1. Surface contour 50, rolling force 52, contact area 54, and contact stress 56 are plotted with respect to x-axes that represent rolling distance and a y-axis that represents magnitudes of surface contour 50, rolling force 52, contact area 54, and contact stress 56. As shown in FIG. 7, rolling force 52 (and therefore rolling power) is increased and reduced in a ramp-like manner until the predetermined rolling force (or rolling power) is reached, which smooths the area between an unrolled surface and a rolled surface. Control module 18 may adjust rolling force 52 based on changes in surface contour 50 so that stress 56 between rolling tool 2.2 and wheelset 1 is constant, as shown in FIG. 7.

Control module 18 may independently change rolling force 52 (and therefore rolling power) in different profile sections. For example, the surface contour 50 along section 60 causes the contact area 54 to have a first area value, and the surface contour 50 along section 62 cause the contact area 54 to have a second area value that is greater than the first area value. Thus, in the transition between section 60 and section 62, control module 18 increases rolling force 52 from a first force value to a second force value. The ratio of the first force value to the second force value is the same as the ratio of the first area value to the second area value so that stress 56 between rolling tool 2.2 and wheelset 1, or rolling force 52 divided by contact area 54, is constant throughout sections 60 and 62.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for machining the wheel running surfaces of wheels for rail vehicles using a wheel machining machine, the method comprising:
   performing a rolling process on the wheels with a rolling tool that applies a rolling force to the wheel;
   adjusting the rolling force by controlling the torques of drive motors of feed axles of the rolling tool; and
   carrying out the rolling process following a re-profiling process;
   wherein the drive motors include a first motor operable to translate the rolling tool along a first axis perpendicular to an axial end surface of the wheels and a second motor operable to translate the rolling tool along a second axis parallel to the axial end surface of the wheels,
   the method further comprising adjusting the rolling force by controlling the torques of the first and second motors.

2. The method of claim 1 wherein the rolling process, after a basic setting of the wheels and the wheel machining machine relative to one another, follows the re-profiling by at least one measurement of the wheels and a machining of the wheels.

3. The method of claim 2 wherein, for re-profiling, measurement and machining are carried out multiple times successively until a specified re-profiling result is achieved.

4. The method of claim 3 wherein the machining is effected by turning.

5. The method of claim 3 wherein a tool for machining clamped in a position is used and a tool for the rolling process is used clamped in the same position, respectively.

6. The method of claim 3 wherein the measurement is carried out after the rolling process.

7. The method of claim 1 further comprising adjusting the rolling force applied by the rolling tool based on individual partial profiles of a wheel.

8. The method of claim 1 further comprising adjusting the rolling force to a predetermined rolling force by adjusting the torques of the first and second motors to first and second predetermined torques, respectively.

9. The method of claim 1 further comprising adjusting the rolling force to a predetermined rolling force that is constant for the entire circumference of the wheels.

10. The method of claim 1 further comprising adjusting the rolling force to achieve a predetermined rolling force that varies depending on at least one of an angular position of the wheels, a position of the rolling tool relative to the wheels, and a geometry of the rolling tool.

11. The method of claim 1 further comprising adjusting the rolling force based on the surface profile of the wheels to achieve a constant contact stress.

\* \* \* \* \*